(12) United States Patent
Woo et al.

(10) Patent No.: US 8,383,737 B2
(45) Date of Patent: Feb. 26, 2013

(54) COMPOUND FOR GAP-FILLING OF SEMICONDUCTOR DEVICE AND COATING COMPOSITION USING THE SAME

(75) Inventors: Chang Soo Woo, Gyeonggi-do (KR); Hyun Hoo Sung, Gyeonggi-do (KR); Jin Hee Bae, Gyeonggi-do (KR); Dong Seon Uh, Gyeonggi-do (KR); Jong Seob Kim, Daejeon (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 276 days.

(21) Appl. No.: 12/451,247

(22) PCT Filed: Dec. 31, 2007

(86) PCT No.: PCT/KR2007/007062
§ 371 (c)(1),
(2), (4) Date: Nov. 3, 2009

(87) PCT Pub. No.: WO2008/136567
PCT Pub. Date: Nov. 13, 2008

(65) Prior Publication Data
US 2010/0093923 A1    Apr. 15, 2010

(30) Foreign Application Priority Data

May 4, 2007    (KR) .................. 10-2007-0043789
May 9, 2007    (KR) .................. 10-2007-0045215

(51) Int. Cl.
*C08L 83/05* (2006.01)
(52) U.S. Cl. .......... 525/474; 524/284; 525/476; 528/31; 528/43
(58) Field of Classification Search .................. None
See application file for complete search history.

(56) References Cited

U.S. PATENT DOCUMENTS

| | | | |
|---|---|---|---|
| 5,077,354 A * | 12/1991 | Woo et al. .................... 528/26 |
| 5,840,821 A | 11/1998 | Nakano et al. |
| 5,859,162 A | 1/1999 | Yamamoto et al. |
| 7,052,770 B2 * | 5/2006 | Furuya et al. ................ 428/447 |
| 7,122,079 B2 * | 10/2006 | Xu et al. .................. 106/287.12 |
| 7,374,856 B2 * | 5/2008 | Suwa et al. .................... 430/169 |
| 7,846,629 B2 * | 12/2010 | Yanus et al. .................... 430/66 |
| 2004/0028915 A1 | 2/2004 | Shibuya et al. |
| 2009/0105360 A1 * | 4/2009 | Niwa et al. .................... 522/47 |
| 2009/0206328 A1 * | 8/2009 | Matsukawa et al. ............ 257/40 |
| 2010/0320573 A1 * | 12/2010 | Uh et al. .................... 257/618 |

FOREIGN PATENT DOCUMENTS

| | | |
|---|---|---|
| JP | 3-116733 A | 5/1991 |
| JP | 11-181352 A | 7/1999 |
| JP | 2001-240802 | 9/2001 |
| JP | 2002-043308 | 2/2002 |
| JP | 2002-060690 | 2/2002 |
| JP | 2005-350558 | 12/2005 |
| JP | 2006-229221 | 8/2006 |
| JP | 2007-016177 | 1/2007 |
| JP | 2007-193318 | 8/2007 |
| WO | WO 2006/073115 * | 7/2006 |
| WO | WO 2007/049440 * | 5/2007 |

* cited by examiner

*Primary Examiner* — Marc Zimmer
(74) *Attorney, Agent, or Firm* — Lee & Morse, P.C.

(57) ABSTRACT

A compound for filling small gaps in a semiconductor device and a composition comprising the compound are provided. The composition can completely fill holes having a diameter of 70 nm or less and an aspect ratio (i.e. height/diameter ratio) of 1 or more in a semiconductor substrate without any defects, e.g., air voids, by a general spin coating technique. In addition, the composition can be completely removed from holes at a controllable rate without leaving any residue by the treatment with a hydrofluoric acid solution after being cured by baking. Furthermore, the composition is highly stable during storage.

18 Claims, No Drawings

COMPOUND FOR GAP-FILLING OF SEMICONDUCTOR DEVICE AND COATING COMPOSITION USING THE SAME

TECHNICAL FIELD

The present invention relates to a compound for filling small gaps in a semi-conductor device and a coating composition using the compound.

BACKGROUND ART

An ideal coating composition for filling small gaps in a semiconductor device must meet the following requirements: (1) Holes whose aspect ratio (i.e. height/diameter ratio) is 1 or more and diameter is 70 nm or less in a substrate must be able to be completely filled by a general spin-coating technique and the substrate must be able to be planarized to have a uniform thickness; (2) No air voids and cracks must be present in the coating film; (3) The thickness of the film must be uniform regardless of the density of the holes in the substrate; (4) The planarized film must be able to be removed at a desired rate by the treatment with a hydrofluoric acid solution after thermal curing without leaving any residue inside the holes; and (5) The coating composition must be stable during storage.

Carbon-based polymers have been used to fill small gaps in semiconductor devices. Recent miniaturization of semiconductor devices has led to a reduction in the size of holes to below 70 nm. However, when conventional carbon-based polymers are finally removed by ashing, the inner surfaces of holes are toughened, which causes difficulty in applying dielectric materials in the subsequent processing step. Thus, there is a need for novel compositions for filling small gaps in semiconductor devices that eliminate the need for ashing to reduce the cost of processing equipment and can be effectively removed by wet etching using a hydrofluoric acid solution for the removal of oxides present in patterned holes.

DISCLOSURE OF INVENTION

Technical Problem

It is one object of the present invention to provide a novel compound for filling small gaps in a semiconductor device that is highly stable during storage and can be removed from holes at a controllable rate by the treatment with a hydrofluoric acid solution after being cured by baking.

It is another object of the present invention to provide a composition comprising the compound.

Technical Solution

According to one aspect of the present invention, there is provided a compound for filling small gaps in a semiconductor device (hereinafter, also referred to simply as a 'gap-filling compound') wherein the compound is prepared by polycondensation of hydrolysates of one or more compounds selected from the group consisting of compounds represented by Formulae 1, 2 and 3:

$$[RO]_3Si—[CH_2]_nX \qquad (1)$$

wherein X is a $C_6$-$C_{12}$ aryl group, n is from 0 to 2 and R is a $C_1$-$C_6$ alkyl group;

$$[RO]_3Si—H \qquad (2)$$

wherein R is a $C_1$-$C_6$ alkyl group; and $$[RO]_3Si—R' \qquad (3)$$

wherein R and R' are independently a $C_1$-$C_6$ alkyl group, in the presence of an acid catalyst.

According to another aspect of the present invention, there is provided a composition for filling small gaps in a semiconductor device (hereinafter, also referred to simply as a 'gap-filling composition'), comprising a compound and a solvent wherein the compound is prepared by polycondensation of hydrolysates of one or more compounds selected from the group consisting of the compounds of Formulae 1, 2 and 3 in the presence of an acid catalyst.

The composition may further comprise at least one additive selected from crosslinking components, crosslinking acid catalysts, stabilizers and surfactants.

Advantageous Effects

The gap-filling composition of the present invention can completely fill holes having an aspect ratio of 1 or more in a semiconductor substrate without any defects, e.g., air voids, by spin coating. In addition, the gap-filling composition of the present invention can be completely removed from holes at a controllable rate without leaving any residue by the treatment with a hydrofluoric acid solution after being cured by baking. Furthermore, the gap-filling composition of the present invention is highly stable during storage. Therefore, the gap-filling composition of the present invention is very suitable for use in the fabrication of semiconductor devices.

BEST MODE FOR CARRYING OUT THE INVENTION

The present invention provides a compound for filling small gaps in a semi-conductor device wherein the compound is a condensation product of hydrolysates prepared by the reaction of a mixture of 5 to 90 parts by weight of a compound of Formula 1:

$$[RO]_3Si—[CH_2]_nX \qquad (1)$$

wherein X is a $C_6$-$C_{12}$ aryl group, n is from 0 to 2 and R is a $C_1$-$C_6$ alkyl group, 0 to 90 parts by weight of a compound of Formula 2:

$$[RO]_3Si—H \qquad (2)$$

wherein R is a $C_1$-$C_6$ alkyl group, and 5 to 90 parts by weight of a compound of Formula 3:

$$[RO]_3Si—R' \qquad (3)$$

wherein R and R' are independently a $C_1$-$C_6$ alkyl group, in the presence of 0.001 to 5 parts by weight of an acid catalyst in 5 to 900 parts by weight of a solvent.

When dry etching is needed, the content of the aryl groups in the compound of Formula 1 may be varied to control the etch rate. The dry etch rate tends to decrease with increasing content of the aryl groups.

The silicon (Si) content of the final compound can be relatively increased with increasing content of the compound of Formula 2 or 3. The wet etch rate of the compound with a hydrofluoric acid solution can be controlled by varying the silicon content of the compound. For example, the wet etch rate tends to increase with increasing silicon content.

The acid catalyst may be selected from the group consisting of nitric acid, sulfuric acid, p-toluenesulfonic acid monohydrate, diethyl sulfate, 2,4,4,6-tetrabromocyclohexadienone, benzoin tosylate, 2-nitrobenzyl tosylate, alkyl esters of organic sulfonic acids, and combinations thereof. The hydrolysis or condensation reaction can be suitably controlled by varying the kind, the amount and the addition mode of the acid catalyst.

In an embodiment, the compound is a polycondensate represented by Formula 4:

$$\{(R'SiO_{1.5})_x(HSiO_{1.5})_y(X(CH_2)nSiO_{1.5})_z\}_m \quad (4)$$

wherein x, y and z satisfy the relations x+y+z=1, $0.05 \leq x \leq 0.9$, $0 \leq y \leq 0.9$ and $0.05 \leq z \leq 0.9$, X is a $C_6$-$C_{12}$ aryl group, R' is a $C_1$-$C_6$ alkyl group, n is from 0 to 2, and m is from 12 to 2,000.

The gap-filling compound of the present invention preferably has a weight average molecular weight of 1,000 to 30,000 and more preferably 1,000 to 10,000. The use of the gap-filling compound having a weight average molecular weight lower than 1,000 causes poor coatability. Meanwhile, the use of the gap-filling compound having a weight average molecular weight higher than 30,000 causes the formation of voids, resulting in a deterioration in gap-filling properties.

In another aspect, the present invention provides a composition for filling small gaps in a semiconductor device which comprises the gap-filling compound and a solvent.

The content of the gap-filling compound in the composition of the present invention is preferably 1 to 50 parts by weight and more preferably 1 to 30 parts by weight, based on 100 parts by weight of the composition.

The solvent may be a single solvent or a mixture of different solvents. When a mixture of different solvents is used, at least one solvent of the mixture is a high-boiling point solvent. The high-boiling point solvent acts to prevent the formation of voids and dry a film to be formed using the composition at a low rate, thus achieving improved flatness of the film. The term "high-boiling point solvent" used herein refers to a solvent that is evaporated at a temperature lower than temperatures required to coat, dry and cure the composition of the present invention.

The solvent may be selected from the group consisting of alcohols, acetates, esters, glymes, ethers and carboxy ketones. Specifically, the solvent is selected from the group consisting of diethylene glycol monomethyl ether, diethylene glycol diethyl ether, ethyl-3-ethoxy propionate, methyl-3-methoxy propionate, cyclopentanone, cyclohexanone, propylene glycol monomethyl ether acetate, propylene glycol dimethyl ether acetate, 1-methoxy-2-propanol, ethyl lactate, cyclopentanone, hydroxyethyl acetate, and the like. These solvents may be used alone or in combination of two or more thereof. To obtain a desired coating thickness, the solvent is preferably used in an amount of 100 to 3,000 parts by weight, based on 100 parts by weight of the gap-filling compound.

Baking may cause self-crosslinking of the gap-filling compound to cure the composition. This self-crosslinking allows the composition of the present invention to be cured by baking without the use of an additional crosslinking component. A further improvement in the crosslinking of the composition can be expected when a crosslinking component is additionally used.

Non-limiting examples of the crosslinking component include melamine-based crosslinking components, substituted urea-based crosslinking components, epoxy-containing polymers, and derivatives thereof. The crosslinking component is preferably present in an amount of 0.1 to 30 parts by weight, based on 100 parts by weight of the gap-filling compound.

In the case where the composition of the present invention comprises the crosslinking component, a crosslinking acid catalyst is preferably added to the composition to activate the crosslinking component. The crosslinking acid catalyst is preferably selected from mineral acids, sulfonic acid, oxalic acid, maleic acid, hexamic cyclohexylsulfonic acid, phthalic acid, and mixtures thereof. The acid catalyst is preferably present in an amount of 0.01 to 10 parts by weight, based on 100 parts by weight of the gap-filling compound.

A stabilizer may be added to the gap-filling composition of the present invention in the presence of the crosslinking acid catalyst to prevent the possibility of damage to the storage stability of the composition during natural curing. The stabilizer may be an organic or inorganic anhydride and is present in an amount of 0.01 to 10 parts by weight, based on 100 parts by weight of the gap-filling compound.

A surfactant may be added to the gap-filling composition of the present invention in the presence of the crosslinking component and the crosslinking acid catalyst to improve the dispersibility, coating thickness uniformity and gap-filling properties of the composition. The surfactant is preferably added in an amount of 0.001 to 5 parts by weight, based on 100 parts by weight of the solids content of the composition. Surfactants suitable for use in the present invention include: i) non-ionic surfactants, for example, polyoxyethylene alkyl ethers, such as polyoxyethylene lauryl ether, polyoxyethylene stearyl ether, polyoxyethylene cetyl ether and polyoxyethylene oleyl ether, polyoxyethylene alkylallyl ethers, such as polyoxyethylene nonylphenol ether, polyoxyethylene•polyoxypropylene block copolymers, and polyoxyethylene sorbitan fatty acid esters, such as sorbitan monolaurate, sorbitan monopalmitate, sorbitan monostearate, sorbitan monooleate, polyoxyethylene sorbitan monostearate, polyoxyethylene sorbitan trioleate and polyoxyethylene sorbitan tristearate; ii) fluorinated surfactants, such as EFTOP EF301, EF303, EF352 (commercially available from Tochem Products Co., Ltd.), MEGAFAC F171, F173 (commercially available from Dainippon Ink and Chemicals Inc.), FLUORAD FC430, FC431 (commercially available from Sumitomo 3M Ltd.), and ASAHI GUARD AG710, SURFLON S-382, SC101, SC102, SC103, SC104, SC105, SC106 (commercially available from Asahi Glass Co., Ltd.); and iii) silicon-based surfactants, such as organosiloxane polymer KP341 (commercially available from Shinetsu Chemical Co., Ltd.). These surfactants may be used alone or in combination with of two or more thereof.

MODE FOR THE INVENTION

Hereinafter, the present invention will be explained in more detail with reference to the following examples. However, these examples are given for the purpose of illustration only and are not to be construed as limiting the scope of the invention.

EXAMPLES

Example 1

661 g of methyltrimethoxysilane and 119 g of phenyltrimethoxysilane were dissolved in 1,820 g of propylene glycol monomethyl ether acetate in a 3-liter four-neck flask equipped with a mechanical agitator, a condenser, a dropping funnel and a nitrogen inlet tube, and then 206 g of an aqueous nitric acid solution (1,000 ppm) was added thereto. Thereafter, the mixture was allowed to react at 50° C. for one hour. Methanol was removed from the reaction mixture under reduced pressure. The reaction was continued for one week while maintaining the reaction temperature at 60° C., yielding a polymer ('Polymer A'). The polymer was measured to have a weight average molecular weight of 4,000 and a polydispersity (PD) of 2. 10 g of Polymer A w as diluted with 100 g of propylene glycol monomethyl ether acetate with sufficient stirring to prepare a gap-filling composition as a solution.

Example 2

10 g of Polymer A prepared in Example 1 was diluted with 100 g of propylene glycol monomethyl ether acetate with sufficient stirring, and 1 g of a melamine-based resin (Cymel 303LF, Cytec, U.S.A.) and 0.1 g of pyridinium p-toluenesulfonate were added thereto to prepare a gap-filling composition as a solution.

Comparative Example 1

10 g of a phenol-novolac resin (PSM-4326, Gunei Chemical Industry Co., Ltd.) was diluted with in 100 g of propylene glycol monomethyl ether acetate with sufficient stirring to prepare a sample solution.

The solutions prepared in Examples 1 and 2 and Comparative Example 1 were tested for gap-filling properties, removal rate and performance by a hydrofluoric acid solution and storage stability (variations in molecular weight and coating thickness) in accordance with the following respective methods. The results are shown in Table 1.

(1) Gap-Filling Properties

Each of the solutions was spin-coated on a patterned silicon wafer having holes (diameter: 68 nm, height: 1,600 nm) under the same conditions. The coated wafer was baked at 240° C. for 50 seconds to cure the solution. The cross section of the wafer was observed under a scanning electron microscope to identify whether the holes were completely filled with the composition without defects.

(2) Removal Rate by Hydrofluoric Acid Solution

Each of the solutions was spin-coated on a patterned silicon wafer having holes (diameter: 68 nm, height: 1,600 nm) under the same conditions. The coated wafer was baked at 240° C. for 50 seconds to cure the solution, dipped in a 6.6% hydrofluoric acid solution (an ammonium fluoride buffer solution) for 5 minutes, washed with distilled water, and sufficiently dried. Thereafter, the cross section of the dried wafer was observed under a scanning electron microscope to measure the height of the remaining composition from the bottom of the holes. A small height indicates that the composition was removed at a high rate by the hydrofluoric acid solution.

(3) Removal Performance by Hydrofluoric Acid Solution

Each of the solutions was spin-coated on a patterned silicon wafer having holes (diameter: 68 nm, height: 1,600 nm) under the same conditions. The coated wafer was baked at 240° C. for 50 seconds to cure the solution, dipped in a 6.6% hydrofluoric acid solution (an ammonium fluoride buffer solution) at 23.0° C. for 30 minutes, washed with distilled water, and sufficiently dried. Thereafter, the cross section of the dried wafer was observed under a scanning electron microscope to identify whether the composition was left inside the holes.

(4) Storage Stability (Variations in Molecular Weight)

After the compositions were stored at 40° C. for 30 days, the molecular weights of the samples were measured. The differences in the molecular weight of the compounds before and after the storage were calculated. Each of the compositions was judged to be 'good' when the difference was within 5% and 'poor' when the difference exceeded 5%.

(5) Storage Stability (Variations in Coating Thickness)

Each of the compositions was spin-coated on an 8" silicon wafer and baked at 240° C. for 50 seconds to form a coating. On the other hand, after the composition was stored at 40° C. for 30 days, the sample was spin-coated on an 8" silicon wafer and baked at 240° C. for 50 seconds to form a coating. The difference in the thickness of the films before and after the storage was calculated. The composition was judged to be 'good' when the difference was within 5% and 'poor' when the difference exceeded 5%.

TABLE 1

| | Gap-filling properties | Removal rate by hydrofluoric acid solution | Removal performance by hydrofluoric acid solution | Storage stability Variations in molecular weight | Variations in coating thickness |
|---|---|---|---|---|---|
| Example 1 | Good | High | Good | Good | Good |
| Example 2 | Good | Medium | Good | Good | Good |
| Comparative Example 1 | Good | Low | Poor | Good | Good |

As can be seen from the results in Table 1, the gap-filling compositions prepared in Examples 1 and 2 could fill the holes whose diameter was below 70 nm and aspect ratio (i.e. height/diameter ratio) was greater than 1 in the semiconductor substrates without any defects, e.g., air voids, by spin coating. In addition, the gap-filling compositions prepared in Examples 1 and 2 could be completely removed from the holes without leaving any residue by the treatment with a hydrofluoric acid solution after being cured by baking. Furthermore, the gap-filling compositions prepared in Examples 1 and 2 were highly stable during storage.

In conclusion, the composition of the present invention is particularly useful in filling small gaps in a semiconductor device, and is a new concept of material that can fill patterned holes and be wet-etched by the treatment with a hydrofluoric acid solution for the removal of oxides present in the pattern, thus avoiding the need for ashing.

INDUSTRIAL APPLICABILITY

The gap-filling composition of the present invention is very suitable for use in the fabrication of semiconductor devices.

The invention claimed is:

1. A composition for filling small gaps in a semiconductor device which comprises:

a polycondensate represented by Formula 4:

$$\{(R'SiO_{1.5})_x(HSiO_{1.5})_y(X(CH_2)_nSiO_{1.5})_z\}_m \qquad (4),$$

wherein x, y and z satisfy the relations x+y+z=1, $0.05 \leq x \leq 0.9$, $0 \leq y \leq 0.9$ and $0.05 \leq z \leq 0.9$, X is a $C_6$-$C_{12}$ aryl group, R' is a $C_1$-$C_6$ alkyl group, n is from 0 to 2, and m is from 12 to 2,000;

a solvent;

at least one stabilizer selected from organic and inorganic anhydrides;

a crosslinking component; and a crosslinking acid catalyst selected from mineral acids, sulfonic acid, oxalic acid, maleic acid, hexamic acid, cyclohexylsulfonic acid, phthalic acid, and mixtures thereof;

wherein the crosslinking component is present in an amount of 0.1 to 30 parts by weight, based on 100 parts by weight of the polycondensate.

2. The composition according to claim 1, wherein the polycondensate has a weight average molecular weight of 1,000 to 30,000.

3. The composition according to claim 1, wherein the polycondensate has a weight average molecular weight of 1,000 to 10,000.

4. The composition according to claim 1, wherein the polycondensate is a condensation product of hydrolysates prepared by the reaction of a mixture of:

5 to 90 parts by weight of a compound of Formula 1, below, $$[RO]_3Si—[CH_2]_nX \quad (1)$$

wherein X is a $C_6$-$C_{12}$ aryl group, n is from 0 to 2 and R is a $C_1$-$C_6$ alkyl group;

0 to 90 parts by weight of a compound of Formula 2, below, $$[RO]_3Si—H \quad (2)$$

wherein R is a $C_1$-$C_6$ alkyl group; and 5 to 90 parts by weight of a compound of Formula 3, below, $$[RO]_3Si—R' \quad (3)$$

wherein R and R' are independently a $C_1$-$C_6$ alkyl group, in the presence of 0.001 to 5 parts by weight of an acid catalyst in 5 to 900 parts by weight of a solvent.

5. The composition according to claim 1, wherein the polycondensate is present in an amount of 1 to 50 parts by weight, based on 100 parts by weight of the composition.

6. The composition according to claim 1, wherein the crosslinking component is selected from melamine-based crosslinking components, substituted urea-based crosslinking components, epoxy-containing polymers, and derivatives thereof.

7. The composition according to claim 1, wherein the crosslinking acid catalyst is present in an amount of 0.01 to 10 parts by weight, based on 100 parts by weight of the polycondensate.

8. The composition according to claim 1, wherein the stabilizer is present in an amount of 0.01 to 10 parts by weight, based on 100 parts by weight of the polycondensate.

9. The composition according to claim 1, wherein the solvent is selected from alcohols, acetates, esters, glymes, ethers, carboxy ketones, and mixtures thereof.

10. The composition according to claim 1, wherein the solvent is present in an amount of 100 to 3,000 parts by weight, based on 100 parts by weight of the polycondensate.

11. The composition according to claim 1, further comprising a surfactant.

12. A composition for filling small gaps in a semiconductor device which comprises:

a polycondensate represented by Formula 4:

$$\{(R'SiO_{1.5})_x(HSiO_{1.5})_y(X(CH_2)_nSiO_{1.5})_z\}_m \quad (4),$$

wherein x, y and z satisfy the relations x+y+z=1, $0.05 \leq x \leq 0.9$, $0 \leq y \leq 0.9$ and $0.05 \leq z \leq 0.9$, X is a $C_6$-$C_{12}$ aryl group, R' is a $C_1$-$C_6$ alkyl group, n is from 0 to 2, and m is from 12 to 2,000;

a solvent; and at least one stabilizer selected from organic and inorganic anhydrides.

13. The composition according to claim 12, wherein the stabilizer is present in an amount of 0.01 to 10 parts by weight, based on 100 parts by weight of the polycondensate.

14. The composition according to claim 12, wherein the polycondensate is a condensation product of hydrolysates prepared by the reaction of a mixture of:

5 to 90 parts by weight of a compound of Formula 1, below, $$[RO]_3Si—[CH_2]_nX \quad (1)$$

wherein X is a $C_6$-$C_{12}$ aryl group, n is from 0 to 2 and R is a $C_1$-$C_6$ alkyl group;

0 to 90 parts by weight of a compound of Formula 2, below, $$[RO]_3Si—H \quad (2)$$

wherein R is a $C_1$-$C_6$ alkyl group; and 5 to 90 parts by weight of a compound of Formula 3, below, $$[RO]_3Si—R' \quad (3)$$

wherein R and R' are independently a $C_1$-$C_6$ alkyl group, in the presence of 0.001 to 5 parts by weight of an acid catalyst in 5 to 900 parts by weight of a solvent.

15. The composition according to claim 12, wherein the polycondensate has a weight average molecular weight of 1,000 to 10,000.

16. The composition according to claim 12, wherein the solvent is selected from alcohols, acetates, esters, glymes, ethers, carboxy ketones, and mixtures thereof.

17. The composition according to claim 12, further comprising a surfactant.

18. The composition according to claim 13, wherein the polycondensate is present in an amount of 1 to 50 parts by weight, based on 100 parts by weight of the composition, and the solvent is present in an amount of 100 to 3,000 parts by weight, based on 100 parts by weight of the polycondensate.

* * * * *